Sept. 16, 1969  J. J. McCARTHY  3,466,715
RELEASABLE PLUG-AND-SOCKET FASTENER
Filed June 5, 1967  2 Sheets-Sheet 1
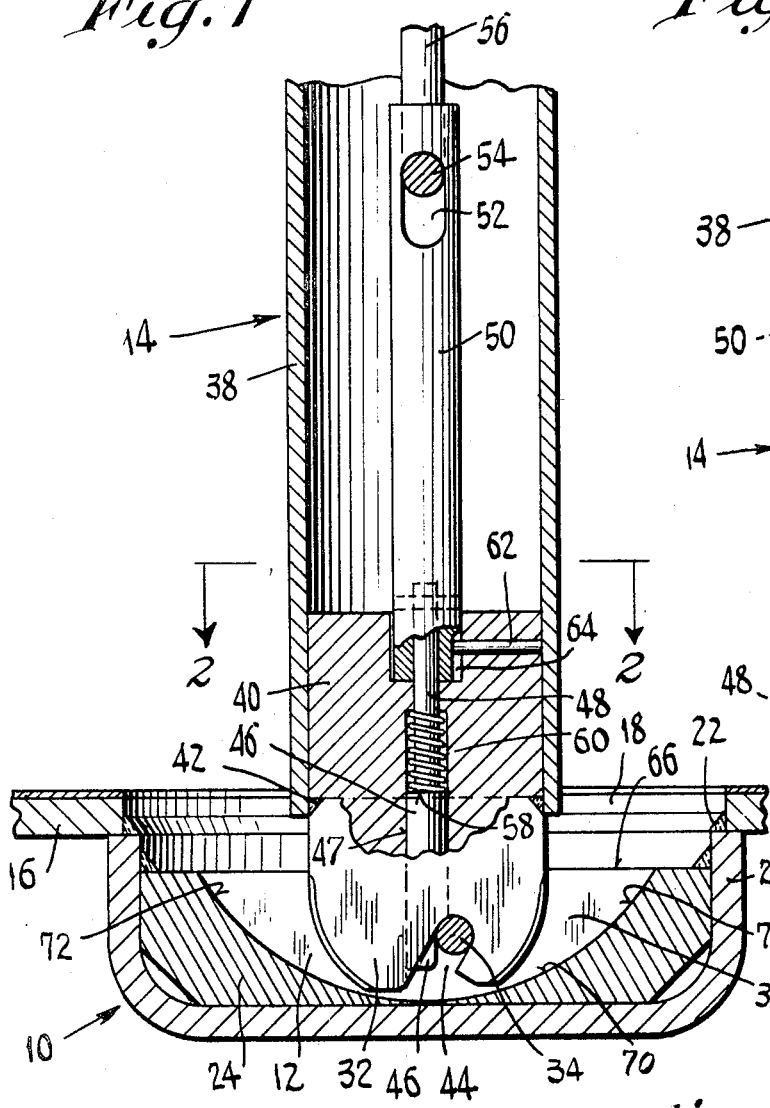
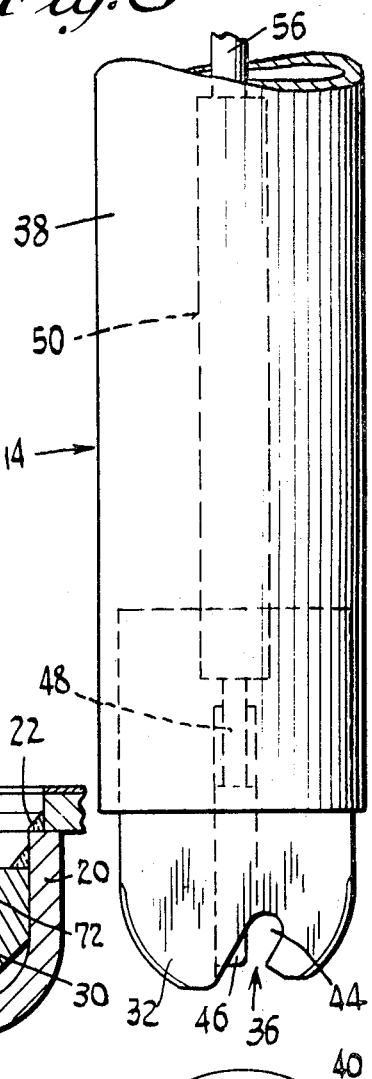
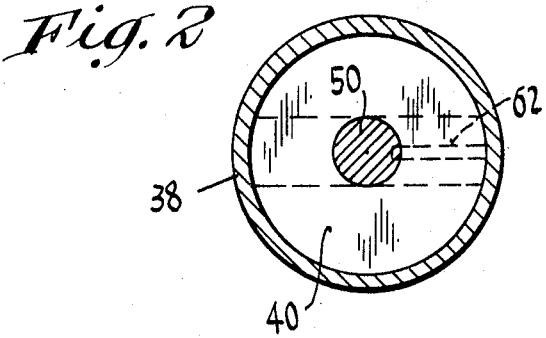
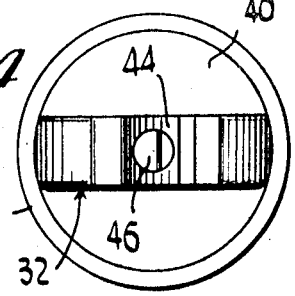
INVENTOR
John J. McCarthy
BY
AGENT Sept. 16, 1969   J. J. McCARTHY   3,466,715
RELEASABLE PLUG-AND-SOCKET FASTENER
Filed June 5, 1967   2 Sheets-Sheet 2
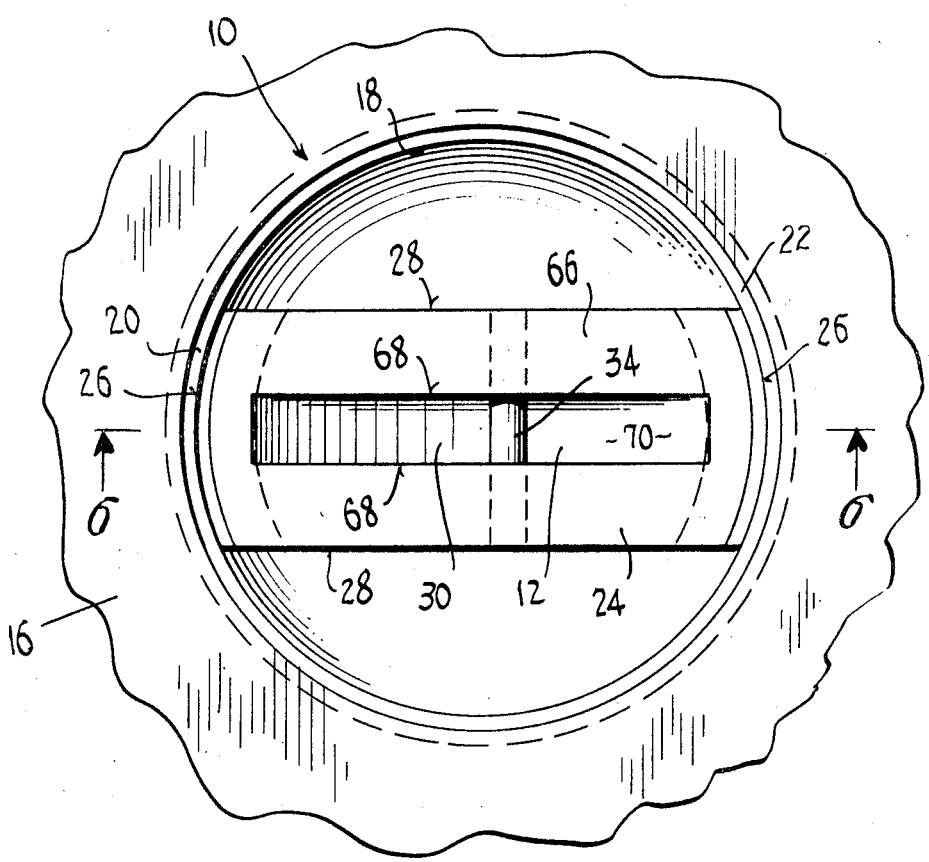
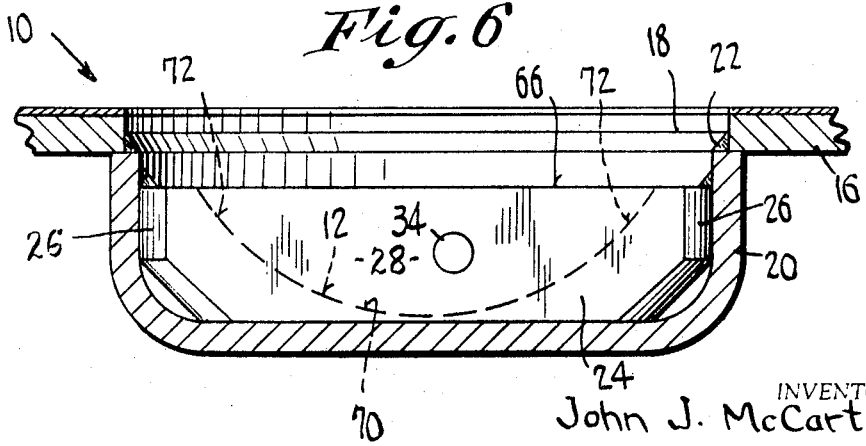
INVENTOR.
John J. McCarthy
BY
H. Gibner Lehmann
AGENT

United States Patent Office 3,466,715
Patented Sept. 16, 1969

3,466,715
RELEASABLE PLUG-AND-SOCKET FASTENER
John J. McCarthy, Weston, Conn., assignor to Norco, Inc., Ridgefield, Conn., a corporation of Connecticut
Filed June 5, 1967, Ser. No. 643,605
Int. Cl. F16b 7/04
U.S. Cl. 24—230                                      1 Claim

ABSTRACT OF THE DISCLOSURE

A plug-and-socket type fastener wherein the socket has in it a diametric cross bar. The plug has a notched forward end and opposite flat sides, the end notch being adapted to accept the diametric cross bar when the plug is inserted in the socket. The socket comprises an apertured face block which carries the cross bar, the aperture comprising an elongate opening or slot through which the flatted plug can be inserted only if it is first oriented or turned to either of two 180° related rotative positions. Such orientation of the plug automatically positions it so that the notched end thereof easily receives the diametric cross bar.

Cross references (1) Copending application, Ser. No. 542,938, John J. McCarthy; (2) copending application, Ser. No. 453,126, John J. McCarthy; (3) copending application, Ser. No. 390,617, John J. McCarthy; (4) U.S. Patent No. 3,280,439; (5) U.S. Patent No. 3,253,310; (6) U.S. Patent No. 3,186,055; (7) U.S. Patent No. 3,110,072; (8) U.S. Patent No. 2,948,383; (9) U.S. Patent No. 2,856,202; (10) U.S. Patent No. 2,560,513.

Background

This invention relates to separable, plug-and-socket type fasteners, and more particularly to quick-realease fasteners of this kind.

Heretofore, many fasteners embodying cross pins and cooperable notched plugs depended, for the orientation or registration of the parts prior to their assembly, on the user turning the plug part to register the slot and pin while visually observing the parts, or on tentatively bringing the parts in contact with each other and using the sense of feel, or on both said procedures.

Under some circumstances, particularly in the case of the latter procedure, damaging, bending or mashing of the pin could occur since the proper orientation depended on actual contact with the pin. In many prior quick-release fasteners the initial touching of the parts involved actual contact with the cooperable elements, as explained above in connection with the cross pin and slot, and under adverse conditions or with rough usage the elements could become burred, bent or otherwise deformed to the extent that the fastener was rendered useless.

Summary

The present invention obviates the above disadvantages of prior plug-and-socket quick release fasteners, and objects of the invention are to provide a novel and improved fastener of the kind identified, wherein the cooperable elements of the fastener parts are more adequately protected against damage or malfunctioning, and wherein the required orientation of the fastener parts does not depend on cooperation of both of the actual active elements which effect the securement.

This is accomplished by making the socket part of the fastener in the form of a fixed apertured face block through which the plug part must pass for its engagement with the cross pin in the socket part, and by making the aperture in the face block and the shape of the plug such that these have matching configurations which do not permit turning of the plug when it is in the block. This construction therefore requires the plug to be turnably oriented prior to insertion into the block, whereby the required orientation effects a correct registration of the plug slot with the cross pin, minimizing the likelihood of damage to these cooperable elements of the fastener.

Preferably the plug has oppositely flatted sides, and the aperture of the face block is elongated or in the form of a slot whereby the plug is insertable in only two different rotative positions in the block, each 180° from the other. Thus the notch of the plug will readily receive the cross pin, due to the inherent nature of the configurations of these elements.

Other objects and advantages are to provide an improved quick-release fastener wherein the initial orientation of the parts during their securement to each other may be quickly and easily effected, particularly by the sense of touch or feeling, wherein protection is afforded the cross pin element in the socket part when the fastener is separated, wherein the pre-orientation of the parts prior to their securement requires but little additional construction and expense, wherein added durability and reliability of the fastener is had, and wherein the fastener parts can be economically fabricated and assembled.

Other features and advantages will hereinafter appear.

In the drawings:

FIG. 1 is an axial sectional view of a plug-and-socket type quick release fastener as provided by the invention.

FIG. 2 is a transverse section through the plug part of the fastener, taken on line 2—2 of FIG. 1.

FIG. 3 is a fragmentary side elevational view of the plug part of the fastener.

FIG. 4 is an end view of the plug part of FIG. 3.

FIG. 5 is a top plan view of the receiver or socket part of the separable fastener, and FIG. 6 is a transverse section of the socket part, taken on line 6—6 of FIG. 5.

As shown, the present improved two-part fastener comprises essentially a socket part 10 having a recess or socket 12 which is adapted to receive a plug part 14. The socket part 10 may be carried by any suitable structure, that shown comprising a floor plate 16 provided with an access opening 18 beneath which there is secured a shallow cup-like member 20. The member 20 may be fastened in any suitable manner, as by means of a welding fillet 22.

Disposed within and secured to the shallow cup 20 is a receiver part or block 24 of somewhat rectangular configuration, having rounded end surfaces 26 and opposite flat sides 28. The receiver block 24 has a central recess 30 adapted to receive a slotted end portion 32 of the plug part 14.

In the recess 30 there is anchored a cross pin 34 which is cooperable with a notch-and-locking formation of the plug part 14, generally designated by the numeral 36.

The plug part 14 comprises a tubular member or arm 38 arranged to be connected to a structure (not shown) which is to be releasably fastened to the floor plate 16. In the lower end of the tubular member 38 there is a cylindrical plug body 40, secured in place as by a welding fillet 42.

Extending downward from the cylindrical plug body 40 is a flatted end portion or nose, which constitutes the above-mentioned lower end 32 of the plug. The end or nose 32 has a transversely extending slot 44 adapted to receive the cross pin 34 of the socket part 10 when the latter and the plug part 14 are in assembled relation as shown in FIG. 1.

For the purpose of releasably retaining the cross pin 10 in the slot 44 and thereby retaining the plug and socket parts in assembled relation, there is a locking pin or plunger 46 carried in a central, axial bore 47 extending in both the plug body 40 and the extension or nose 32 thereof. The locking pin 46 is vertically movable as viewed in FIG. 1, and has a shank 48 of reduced diameter, rigidly affixed to an actuator bar 50 disposed in the lower portion of the tubular member 38.

The actuator bar 50 has a slot 52 receiving the lower end portion 54 of an actuator rod 56 which extends upward through the tubular body 58 and terminates in a suitable operator device (not shown) intended to be actuated by the user for the purpose of effecting release of the fastener parts. The locking pin 46 includes a shoulder 58 engaged by a helical compression spring 60, by which the locking pin 46 is normally biased downward to a protruding, locking position as seen in FIG. 1. A keying pin 62 in the plug body 40 is received in a side groove 64 of the actuator bar 50, for the purpose of preventing turning of said bar and the locking pin.

It will be understood that, from the position shown in FIG. 1 the locking pin 46 may be shifted upward to a non-protruding position whereby it becomes disengaged from the cross pin 34 and releases the latter, enabling the plug part 14 to be withdrawn from the recess 30 of the socket part 10. Upon removal of the lifting force from the locking pin 46, the spring 60 will return the same to the protruding, locking position. When the plug part 14 is being applied to the socket part 10, the force of the cross pin 34 exerted on the bottom end of the locking pin 46 will effect a retraction or upward movement of the latter until the cross pin is fully seated in the transverse notch 44 of the nose portion 32. The locking pin 46 will then snap downward, holding the cross pin 34 captive and maintaining the plug part 14 attached to the socket part 10.

In accordance with the present invention, means are provided which require a specific or predetermined rotative orientation of the plug part 14 with respect to the socket part 10 prior to assemblage of such parts and contact with the cross pin 34, whereby the notch 44 in the nose portion 32 will be brought into parallelism with the cross pin 34, thereby properly positioning these cooperable elements to facilitate the reception of the cross pin in the notch. Such means or device comprises a facing portion 66 of the block 24, surrounding the mouth of the recess 30 thereof, said facing portion having an opening which is adapted to receive the flatted end or nose 32 of the plug part. The said opening is essentially the same as the upper portion of the socket 30 in the block 24, although it need not necessarily be so. The edges of the opening in the facing portion 66, comprising the flat sides 68, are cooperable with the nose portion 32 of the plug part, and are related to the cross-sectional configuration thereof in such a manner that insertion of the plug part 14 in the socket part 10 is possible only in a relative position of the plug part which brings the notch 44 thereof in parallelism with the cross pin 34 of the socket part. Thus, the joining of the fastener parts 10 and 14 to each other is facilitated and at the same time there is minimized any likelihood of damage, particularly to the cross pin 34, which might otherwise occur if the fastener parts were not properly oriented or registered prior to their being engaged with each other.

The recess or socket 30 in the block 24 has a concave bottom wall 70, and the upper end portions 72 of such bottom wall are spaced from the plug part to permit the latter to swivel about the cross pin 34, as will be understood from a consideration of FIG. 1.

Also, the upper end portions 72 of the bottom wall serve an important purpose in that they tend to centralize the rounded end or nose portion 32 of the plug part upon said rounded end engaging the bottom wall. From an inspection of FIG. 1 it will be seen that the bottom wall 70 has, in effect, oppositely-disposed inwardly sloped surfaces in the portions 72, to effect this centralizing, such surfaces being inclined in reverse directions so that, when engaged by the rounded nose 32, they cam the latter toward the cross pin 34.

It will now be seen from the foregoing that I have provided a novel and improved, simplified fastener construction of the plug-and-socket type, wherein the socket contains a cross pin constituting one of the cooperable elements of the fastener, said construction being so arranged that the plug part must first be rotatively properly oriented with respect to the socket part before the cross pin is engaged by the cooperable element of the plug part. The disposition of the cross pin 34 in the narrow, slot-like socket 30 constitutes a protection for the pin in addition to the protection afforded by requiring prior orientation of the plug part before it can be brought into contact with the cross pin.

The improved fastener construction above described involves relatively few parts, which may be economically fabricated and assembled. The organization by which the orientation of the plug part with the socket part is effected is especially simple and foolproof, and enables the user to employed the tactual sense or sense of feeling in addition to the visual sense, or even in place of the latter, when assembling the fastener parts to each other.

Variations and modifications may be made within the scope of the claim, and portions of the improvement may be used without others.

I claim:
1. A quick-release two-part separable fastener comprising, in combination:
   (a) a socket part comprising a member having a recess which is accessible to the exterior of the socket part,
   (b) a cross pin carried substantially centrally by said socket part and disposed in and extending across the recess thereof,
   (c) a plug part having a rounded and notched end receivable in said recess of the socket part, the notch in the end of the plug part being adapted to receive the said cross pin when the plug part is received in the socket part,
   (d) the end of the plug part having a non-round cross-sectional configuration, wherein the improvement comprises:
   (e) means on the socket part, providing a facing surrounding the mouth of the recess in said part, said means having an opening adapted to receive the end of the plug part, the edges of said opening being cooperable with the plug part and being related to the cross sectional configuration thereof in such manner that insertion of said plug part in the socket part is possible only in a relative position of the plug part which brings the notch thereof in parallelism with said cross pin, thereby to facilitate joining of the fastener parts,
   (f) said socket part having means comprising a bottom wall in said recess, tending to centralize the rounded end of the plug part upon said rounded end engaging said bottom wall,
   (g) said bottom wall having oppositely-disposed inwardly sloped surfaces to effect said centralizing, said surfaces being inclined in reverse directions such that, when engaged by said rounded end, they cam the latter toward the cross pin.

References Cited

UNITED STATES PATENTS

| 932,233 | 8/1909 | Adams | 5—296 |
| 2,592,843 | 4/1952 | Andrews | 24—239 |
| 3,148,909 | 9/1964 | Tantlinger | 24—239 X |
| 3,253,310 | 5/1966 | McCarthy. | |

BERNARD A. GELAK, Primary Examiner

U.S. Cl. X.R.

24—211, 239; 287—20